United States Patent
Oh et al.

(10) Patent No.: US 11,438,138 B2
(45) Date of Patent: Sep. 6, 2022

(54) ADDITIVELY-HOMOMORPHIC METHOD AND APPARATUS SPECIALIZED FOR NON-INTERACTIVE ZERO-KNOWLEDGE PROOF

(71) Applicants: IUCF-HYU (Industry-University Cooperation Foundation Hanyang University), Seoul (KR); Kookmin University Industry Academy Cooperation Foundation, Seoul (KR)

(72) Inventors: Hyunok Oh, Seoul (KR); Jiwon Lee, Seoul (KR); Jihye Kim, Seoul (KR)

(73) Assignees: IUCF-HYU (Industry-University Cooperation Foundation Hanyang University), Seoul (KR); Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 17/185,274

(22) Filed: Feb. 25, 2021

(65) Prior Publication Data
US 2021/0297235 A1    Sep. 23, 2021

(30) Foreign Application Priority Data
Mar. 23, 2020  (KR) .................. 10-2020-0034862

(51) Int. Cl.
*H04L 9/06*    (2006.01)
*H04L 9/00*    (2022.01)
(Continued)

(52) U.S. Cl.
CPC ........... *H04L 9/0618* (2013.01); *H04L 9/008* (2013.01); *H04L 9/0861* (2013.01); *H04L 9/3218* (2013.01); *H04L 2209/08* (2013.01)

(58) Field of Classification Search
CPC ..... H04L 9/0618; H04L 9/008; H04L 9/0861; H04L 9/3218; H04L 2209/08; H04L 2209/04
See application file for complete search history.

(56) References Cited

U.S. PATENT DOCUMENTS

2020/0005173 A1*  1/2020  del Pino ............... H04L 9/3218
2021/0336792 A1* 10/2021  Agrawal ................ H04L 9/085

FOREIGN PATENT DOCUMENTS

KR    10-1105205 B1    1/2012

OTHER PUBLICATIONS

Ronald Cramer et al., "A Secure and Optimally Efficient Multi-Authority Election Scheme", Rosario Gennaro, Berry Schoenmakers, EUROCRYPTO 97, Aug. 11, 1997.

(Continued)

*Primary Examiner* — Vu V Tran
(74) *Attorney, Agent, or Firm* — Novick, Kim & Lee, PLLC; Jae Youn Kim

(57) ABSTRACT

Disclosed are homomorphic encryption method and apparatus specialized for zero-knowledge proof. The homomorphic encryption method specialized for zero-knowledge proof includes (a) dividing a message M into n message blocks; (b) generating a ciphertext CT by encrypting the n message blocks, wherein the ciphertext CT includes each encryption block for each of the n message blocks, and each encryption block includes the message block in the form $G_t^{m_i}$ of an exponentiation of a generator G; and (c) generating a zero-knowledge proof key $\pi$ for the n message blocks by applying the n message blocks as inputs to a preset zero-knowledge proof algorithm.

11 Claims, 4 Drawing Sheets

(51) Int. Cl.
  *H04L 9/08* (2006.01)
  *H04L 9/32* (2006.01)

(56) References Cited

OTHER PUBLICATIONS

Jens Groth, "One the Size of Pairing-Based Non-interactive Arguments", EUROCRYPT 2016.
Thao Thi Ai Nguyen et al., "Enhanced security in internet voting protocol using blind signature and dynamic ballots", Electronic Commerce Research (2013.), Dec. 2012.

\* cited by examiner

Algorithm 1 Encryption-in-the-circuit relation$_{enc}$($PK, CT, \phi_{n+1}, \ldots, \phi_l; M$):
    $CT \leftarrow \Pi_{RR,AH}.\text{Enc}(PK, M)$
    ...

relation$_{rerand}$($PK, CT', \phi_{n+1}, \ldots, \phi_l; \pi, CT$):
    $\Pi_{snark}.\text{Verify}(\pi, PK, CT, \phi_{n+1}, \ldots, \phi_l)$
    $CT' \leftarrow \Pi_{RR,AH}.\text{Rerandomize}(PK, CT)$ relation$_{dec}$($CT, M; SK$)
    $M \leftarrow \Pi_{RR,AH}.\text{Dec}(SK, CT)$

FIG. 2

```
Algorithm 2 SAVER construction
relation(m_1,...,m_n, φ_{n+1},...,φ_l; w):
    ...

Setup(relation):
    CRS ← Π_{snark}.Setup(relation)
    CRS ← CRS ∪ {G^{γ²}}
    return CRS KeyGen(CRS):
    {s_i}_{i=0}^{n}, {v_i}_{i=1}^{n}, {t_i}_{i=0}^{n}, ρ ←$ Z_p
    PK ← (G^s, {G^{δs_i}}_{i=1}^{n}, {G^{t_i}}_{i=0}^{n}, {H^{v_i}}_{i=1}^{n}, G^{ρv_0}, Π_{i=1}^{n} G^{s_i v_i}, G^{-γ(1+Σ_{i=1}^{n} s_i)})
    SK ← ρ
    VK ← (H^ρ, {H^{ρv_i}}_{i=1}^{n}, {H^{v_i}}_{i=n+1}^{l})
    return (SK, PK, VK)

Enc(CRS, PK, m_1,...,m_n, φ_{n+1},...,φ_l; w):
    let PK = (X_0, {X_i}_{i=1}^{n}, {Y_i}_{i=1}^{n}, {Z_i}_{i=0}^{n}, P_1, P_2)
    r ←$ Z_p
    CT = (X_0^r, X_1^r G^{m_1},..., X_n^r G^{m_n}, φ = P_1^r · Π_{i=1}^{n} Y_i^{m_i})
    π̃ = (A, B, C) ← Π_{snark}.Prove(CRS, m_1,...,m_n, φ_{n+1},...,φ_l; w)
    π ← (A, B, C · P_2^r)
    return (π, CT)

Rerandomize(PK, π, CT):
    parse π = (A, B, C) and CT = (c_0,...,c_n, φ)
    let PK = (X_0, {X_i}_{i=1}^{n}, {Y_i}_{i=1}^{n}, {Z_i}_{i=0}^{n}, P_1, P_2)
    r', z_1, z_2 ←$ Z_p
    CT' ← (c_0 · X_0^{r'},..., c_n · X_n^{r'}, φ', P_1^{r'})
    π' ← (A^{z_1}, B^{z_1^{-1}} · H^{z_1 z_2}, C · A^{z_1 z_2} · P_2^{r'})
    return (π', CT')

Verify_Enc(CRS, π, CT, φ_{n+1},...,φ_l):
    parse π = (A, B, C) and CT = (c_0,...,c_n, φ)
    assert Π_{i=0}^{n} e(c_i, H^{v_i}) = e(φ, H)
    assert e(A, B) = e(G^α, H^β) · e(Π_{i=0}^{n} c_i · Π_{i=n+1}^{l} G^{φ_i}, H^γ) · e(C, H^δ)

Dec(CRS, SK, VK, CT):
    parse SK = ρ, VK = (V_0, {V_i}_{i=1}^{n}, {V_i}_{i=n+1}^{l}), and CT = (c_0,...,c_n, φ)
    for i = 1 do to n
        e(c_i, V_{n+i}) / e(c_0, V_i) = e(G, V_{n+i})^{m_i}
        compute a discrete log of e(G, V_{n+i})^{m_i} to obtain m_i
    end for
    ν ← φ / c_0^ρ
    return (m_1,...,m_n, ν)

Verify_Dec(CRS, VK, m_1,...,m_n, ν, CT):
    parse VK = (V_0, {V_i}_{i=1}^{n}, {V_i}_{i=n+1}^{l}) and CT = (c_0,...,c_n, φ)
    assert e(ν, H) = e(c_0, V_0)
    for i = 1 do to n
        assert e(c_i, V_{n+i}) / e(ν, V_i) = e(G, V_{n+i})^{m_i}
    end for
```

FIG. 3

ADDITIVELY-HOMOMORPHIC METHOD AND APPARATUS SPECIALIZED FOR NON-INTERACTIVE ZERO-KNOWLEDGE PROOF

CROSS-REFERENCE TO RELATED APPLICATION

This application claims under 35 U.S.C. § 119(a) the benefit of Korean Patent Application No. 10-2020-0034862 filed on Mar. 23, 2020, the entire contents of which are incorporated herein by reference.

BACKGROUND

(a) Technical Field

The present invention relates to homomorphic encryption method and apparatus specialized for non-interactive zero-knowledge proof.

(b) Background Art

Recently, in order to prove a legitimate operation while protecting privacy in a blockchain system that guarantees privacy, a cloud system that delegates calculations, or the like, a (pairing-based) succinct non-interactive zero-knowledge proof (hereinafter referred to as zk-SNARK: zero-knowledge Succinct Non-interactive Arguments of Knowledge) using a pairing operation of an elliptic curve group has been used as an essential design tool.

The zk-SNARK is a technology that does not disclose secret values used in a circuit while proving the fact that an operation on the corresponding circuit has been performed based on a general circuit input. The zk-SNARK technology is used in various applications, and is often used in combination with an encryption technology depending on the application.

That is, there are a plurality of applications that prove the fact that a plaintext satisfies a specific attribute through the zk-SNARK while generating a ciphertext from the plaintext. However, in this case, in order to connect that the same plaintext was used for both the generation of the ciphertext and the attribute proof, the zk-SNARK should include all circuit inputs including not only the attribute proof but also the ciphertext generation process.

The ciphertext generation process has a large number of complex cryptographic operations, resulting in increasing the circuit input, which has a disadvantage of being impractical due to the characteristics of zk-SNARK in which a proof time and the size of a proof key are proportional to the circuit input.

Therefore, there is a need for a method for solving these problems.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the present invention is to provide homomorphic encryption method and apparatus specialized for non-interactive zero-knowledge proof, thereby efficiently reducing a proof time and the size of a proof key by separating an encryption method without being included in a circuit input of the zero-knowledge proof.

According to an aspect of the present invention, there is disclosed a homomorphic encryption method specialized for non-interactive zero-knowledge proof.

According to an embodiment of the present invention, there is provided a homomorphic encryption method specialized for zero-knowledge proof including (a) dividing a message M into n message blocks; (b) generating a ciphertext CT by encrypting the n message blocks, wherein the ciphertext CT includes each encryption block for each of the n message blocks, and each encryption block includes the message block in the form $G_i^{m_i}$ of an exponentiation of a generator G; and (c) generating a zero-knowledge proof key $\pi$ for the n message blocks by applying the n message blocks as inputs to a preset zero-knowledge proof algorithm, wherein i represents an index of the message block.

The homomorphic encryption method may further include generating a common reference string (CRS) using a relation R before step (c), wherein the relation R includes the n message blocks as input/output statements, and the CRS includes $G^{-r}$, wherein G represents a generator and r represents a random value.

Each of the encryption blocks may further include a blind factor $X^r$.

The homomorphic encryption method may further include verifying the zero-knowledge proof $\pi$ by using the CRS, the ciphertext CT, the zero-knowledge proof $\pi$, and a part of the relation R.

The homomorphic encryption method may further include rerandomizing the ciphertext CT and the zero-knowledge proof $\pi$ using a public key, before step (c).

The homomorphic encryption method may further include acquiring a plurality of message blocks by decrypting the ciphertext CT using a CRS, a secret key, and a verification key; and restoring the message M by combining the plurality of message blocks.

According to another aspect of the present invention, there is provided a homomorphic encryption apparatus specialized for zero-knowledge proof.

According to an embodiment of the present invention, there is provided a computing device including a division unit configured to divide a message M into n message blocks; and an encryption unit configured to generate a ciphertext CT by encrypting the n message blocks and generate a zero-knowledge proof key $\pi$ for the n message blocks by applying the n message blocks as inputs to a preset zero-knowledge proof algorithm, wherein the ciphertext CT includes each encryption block for each of the n message blocks, and each encryption block includes the message block in the form $G_i^{m_i}$ of an exponentiation of a generator G, wherein i represents an index of the message block.

The computing device may further include an initial setting unit configured to generate a common reference string (CRS) using a relation R, wherein the relation R includes the n message blocks as input/output statements, and the CRS includes $G^{-r}$, wherein G represents a generator and r represents a random value.

Each of the encryption blocks may further include a blind factor $X^r$.

The computing device may further include a verification unit configured to verify the zero-knowledge proof $\pi$ by using the CRS, the ciphertext CT, the zero-knowledge proof $\pi$, and a part of the relation R.

The computing device may further include a rerandomization unit configured to rerandomize the ciphertext CT and the zero-knowledge proof $\pi$ using a public key.

The computing device may further include a decryption unit configured to acquire a plurality of message blocks by decrypting the ciphertext CT using the CRS, a secret key, and a verification key and restore the message M by combining the plurality of message blocks.

The effects of the present invention are not limited to the aforementioned effect, and other effects not mentioned above will be clearly understood to those skilled in the art from the description of the appended claims.

BRIEF DESCRIPTION OF THE DRAWINGS

FIG. 2 is a diagram illustrating pseudo codes of a zero-knowledge proof algorithm to which an in-circuit encryption method is applied.

FIG. 3 is a diagram illustrating pseudo codes of a homomorphic encryption method specialized for zero-knowledge proof according to an embodiment of the present invention.

DETAILED DESCRIPTION

Figure 1:
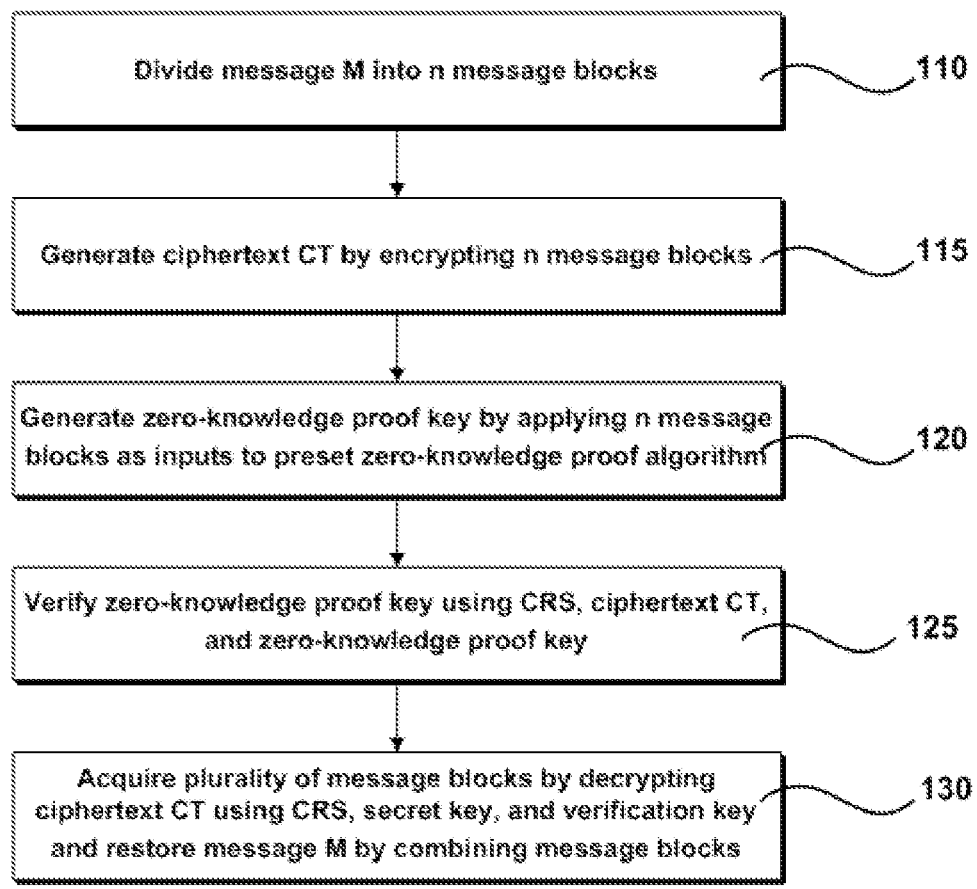
FIG. 1 is a flowchart illustrating a homomorphic encryption method specialized for non-interactive zero-knowledge proof according to an embodiment of the present invention.

A singular form used in the present specification may include a plural form if there is no clearly opposite meaning in the context. In this specification, terms such as "comprising" or "including" should not be interpreted as necessarily including all various components or various steps disclosed in the specification, and it should be interpreted that some component or some steps among them may not be included or additional components or steps may be further included. In addition, terms including 'unit', "module", and the like disclosed in the specification mean a unit that processes at least one function or operation and this may be implemented by hardware or software or a combination of hardware and software.

Hereinafter, embodiments of the present invention will be described in detail with reference to the accompanying drawings.

Unlike a conventional method in which encryption is added to zero-knowledge proof, in a homomorphic encryption method specialized for zero-knowledge proof according to an embodiment of the present invention, an encryption method may not be included in a circuit input of zero-knowledge proof by a method of linking the encryption and the zero-knowledge proof for a message.

Through this, the present invention has an advantage of enabling homomorphic encryption and zero-knowledge proof for a message, and enabling zero-knowledge proof for a message without exposing a secret key and the like to the outside.

As such, in order to enable the linkage of the homomorphic encryption of the message and the zero-knowledge proof thereof, in an embodiment of the present invention, a relation set R will be defined as follows.

Relation Set R (Relations)

A security parameter is denoted by $1^\lambda$. When the security parameter $1^\lambda$ is given, a relation generator $\mathcal{RG}$ returns a polynomial time-determinable relation $\mathcal{R} \leftarrow \mathcal{RG}(1^\lambda)$. In $(\Phi,\omega)\in\mathcal{R}$, $\omega$ is a witness to an input/output (I/O) statement $\Phi$ that belongs to a relation. $\Phi$ consists of $M=\{m_1, \ldots, m_n\}$ and $\Phi=M\cup\hat{\Phi}$ for any $\hat{\Phi}=\{\phi_{n+1}, \ldots, \phi_l\}$. Here, l represents the number of I/O statements.

In addition, even if there is no separate description below, it should be understood that a generator according to an embodiment of the present invention generates a bilinear group. This will be described in brief.

A bilinear group generator $\mathcal{BG}$ takes a secret parameter as an unary input and returns a nonlinear group (p, $\mathbb{G}_1$, $\mathbb{G}_2$, $\mathbb{G}_T$, e, aux). Here, the nonlinear group consists of a cyclic group $\mathbb{G}_1$, $\mathbb{G}_2$, $\mathbb{G}_T$ of a basic order p and a bilinear map e: $\mathbb{G}_1\times\mathbb{G}_2\to\mathbb{G}_T$. e: $\mathbb{G}_1\times\mathbb{G}_2\to\mathbb{G}_T$ may include auxiliary information aux.

An efficient algorithm exists for calculating a group task, evaluating a bilinear map, determining a group membership, and a sampling generator for a group generator.

The map is bilinear for all $G\in\mathbb{G}_1$ and $H\in\mathbb{G}_2$. The following equation may be acquired for a, b $\in\mathbb{Z}$.

$$e(G^a,H^b)=e(G,H)^{ab}$$

Also, the map is non-degenerate. For example, if e(G,H) =1, G=1 or H=1.

Usually, the bilinear group consists of an elliptic curve with pairs and may be adjusted to generate a non-degenerate nonlinear map. There are many methods to configure the nonlinear groups. For example, there are a symmetric nonlinear group such as $\mathbb{G}_1=\mathbb{G}_2$, an asymmetric nonlinear group such as $\mathbb{G}_1\neq\mathbb{G}_2$, and the like.

In an embodiment of the present invention, it is assumed that the nonlinear group is configured as an asymmetric group (type III) without non-trivial homogeneity that may be efficiently calculated in any direction between $\mathbb{G}_1$ and $\mathbb{G}_2$, and it will be mainly described.

A type III bilinear group is the most efficient type of bilinear group, and is most suitable to be applied to a practical application.

As described above, in an embodiment of the present invention, a homomorphic encryption method for a message M is not used as a circuit input for zero-knowledge proof, and may be provided to have connectivity between the encryption method and an attribute proof.

This will be more clearly understood by the following description. In the following description, since the zero-knowledge proof method itself is a known matter, a detailed description of the zero-knowledge proof method will not be separately described, and only technical matters required for the description of the main subject matter of the present invention will be described.

FIG. 1 is a flowchart illustrating a homomorphic encryption method specialized for non-interactive zero-knowledge proof according to an embodiment of the present invention, FIG. 2 is a diagram illustrating pseudo codes of a zero-knowledge proof algorithm to which an in-circuit encryption method is applied, and FIG. 3 is a diagram illustrating pseudo codes of a homomorphic encryption method specialized for zero-knowledge proof according to an embodiment of the present invention.

In step 110, a computing device 100 divides a message M into n message blocks.

The message M is divided into n blocks to have a vector form such as $M=\{m_1, \ldots, m_n\}$. That is, $M=\{m_1, \ldots, m_n\}$.

In step 110, the computing device 100 generates a ciphertext CT by encrypting the n message blocks. It is natural that an initial setting process may precede the step of generating the ciphertext CT. For example, as illustrated in FIG. 3, the computing device 100 may acquire a relation R, and generate a common reference string (CRS) using the relation R, and generate a public key, a secret key, and a verification key based on the generated CRS.

The ciphertext CT consists of n+2 blocks. For example, $CT = \{c_0, \ldots, c_n, \psi\}$. Here, $c_0$ includes a random value, $\psi$ includes encryption proof, and the remaining $c_i$ includes encryption of each message block $m_i$. Here, $1 \leq i \leq n$.

In this case, the computing device 100 may generate a ciphertext CT form to have a form similar to a proof key (zero-knowledge proof key) used for verification of the zero-knowledge proof when encrypting the n message blocks.

To this end, the computing device 100 according to an embodiment of the present invention may generate the ciphertext CT so as to include each of the n message blocks as an exponentiation of a generator G. As such, by making each of the n message blocks in the form of an exponentiation of the generator G, there are advantages of not only having connectivity with the attribute proof of the zero-knowledge proof, but also blinding each message block so as to make it impossible to decrypt each message block even if each message block is exposed.

In addition, the computing device 100 may be plugged into an additional isomorphic encryption based on ELGamal encryption so that each encryption block for the n message blocks satisfies an additively homomorphic encryption attribute.

Accordingly, according to an embodiment of the present invention, instead of encrypting each of the n message blocks, each of the n message blocks may be generated in the form of an exponentiation of the generator G and then encrypted.

In addition, encryption blocks for the n message blocks according to an embodiment of the present invention may be generated to include a blind factor in addition to generating each message block in the form of the exponentiation of the generator G. This will be more clearly understood by the following description.

In order to facilitate understanding and convenience of explanation, a zero-knowledge proof algorithm to which an in-circuit encryption method is applied will be briefly described with reference to FIG. 2.

In the zk-SNARK, three separate relations for $relation_{enc}$, $relation_{rerand}$ and $relation_{dec}$ are required to satisfy a desired attribute of the zero-knowledge proof.

In $relation_{enc}$, a rerandomizable homomorphic encryption $\Pi_{RR,AH}$ such as Paillier is combined with an arbitrary relation to satisfy verifiable additively homomorphic encryption.

In $relation_{rerand}$ for a possibility of rerandomization, the relation includes verification of a proof key $\pi$ to check the relation of the ciphertext CT.

For example, in a voting application, an administrator needs to first verify a vote before rerandomizing the vote to check whether the vote has been honestly generated from a legitimate user.

In $relation_{dec}$, a decryption algorithm should be included to provide a verifiable decryption attribute. When the encryption is verifiably performed by including the above-described relation, encryption construction is very inefficient.

An ENC function needs to include $\Pi_{snark}.\text{Prove}(relation_{enc})$, a Rerandomize function needs to include $\Pi_{snark}.\text{Prove}(relation_{rerand})$, and a DEC function needs to include $\Pi_{snark}.\text{Prove}(relation_{dec})$.

In other words, the process needs to be performed to include the attribute proof in each of the ENC, Rerandomize, and DEC processes that are essentially performed during encryption. This is very inefficient.

Accordingly, in order to avoid this inefficient problem, in an embodiment of the present invention, the encryption is separated from the relation of zk-SNARK, and connectivity between hash & proof FFG+16− or commit & proof CFQ19 may be provided.

Like FFG+16−, combining the zk-SNARK with encryption through commitments may require additional verification of the linkage. Instead of verifying each linkage, in an embodiment of the present invention, the ciphertext may be mixed with the original zk-SNARK verification by substituting an input/output state.

In Gro16, zk-SNARK verification may be expressed as in Equation 1.

$$e(A, B) = e(G^\alpha, H^\beta) \cdot e\left(\prod_{i=0}^{l} G_i^{\phi_i}, H^\gamma\right) \cdot e(C, H^\delta) \quad \text{[Equation 1]}$$

$(\phi_1, \ldots, \phi_l)$ may be a plaintext as well as any statement. It is assumed that $\phi_1$ has been encrypted. It will be referred to as a plaintext message $M = \phi_1$. At this time, according to an embodiment of the present invention, a ciphertext $CT = G_1^M$ may be configured similar to ELGamal encryption that maintains an original verification format.

This may be expressed as Equation 2.

$$e(A, B) = e(G^\alpha, H^\beta) \cdot e\left(CT \cdot \prod_{i=2}^{l} G_i^{\phi_i}, H^\gamma\right) \cdot e(C, H^\delta) \quad \text{[Equation 2]}$$

It is obvious that the CT should include an additional blind factor in $G_1^M$. Assuming that the blind factor is $X^r$, it becomes $CT = X^r \cdot G_1^M$, and $e(X^r \cdot G_1^M \cdot \Pi_{i=2}^l G_i^{\phi_i}, H^\gamma)$ pairing generates an unintended term $\gamma^r$ that breaks an inequality of Equation 2 in $e(X^r, H^\gamma)$.

In order to solve this problem, in an embodiment of the present invention, $G^{-\gamma}$ may be included in a common reference string (CRS). A prover can modify a proof factor C to $C = C \cdot G^{-\gamma r}$ so that the term $\gamma^r$ may be removed from $e(C, H^\delta)$ with respect to $\delta$. As a result, the verification of zk-SNARK may ensure the integrity of M within the relation with existence of M in the ciphertext.

According to an embodiment of the present invention, the $G_i^M$ form may be plugged into an additively homomorphic cipher based on ELGamal encryption. It is easy to modify the ELGamal encryption by encrypting $G_i^M$ instead of M to achieve the additively homomorphic cipher such as $G_i^{M_1} \cdot G_i^{M_2} = G_i^{M_1 + M_2}$. In this case, since the decryption needs to find a short discrete log of $G_i^M$, the messages are limited to be short.

Accordingly, in an embodiment of the present invention, the message M is divided into n message blocks such as $M = (m_1 \| \ldots \| m_n)$ (e.g. $|m_i| = 4$ bits), and each message block $m_i$ is encrypted in the form of $X_i^r \cdot G_i^{m_i}$. Here, $X_i^r$ is the blind factor.

A decrypter capable of removing the blind factor may acquire a message block $m_i$ by a simple brute-forcing technique.

Pseudo codes for the homomorphic encryption method specialized for zero-knowledge proof according to an embodiment of the present invention is as illustrated in FIG. 3. This will be described in brief.

The relation function represents an arbitrary relation R for zk-SNARK. In addition, $\alpha$, $\beta$, $\gamma$, and $\delta$ in the function are derived from a common reference string (CRS) of the adopted zk-SNARK.

SAVER receives an arbitrary relation consisting of two I/O states. Here, $m_1, \ldots, m_n$ is encrypted, and $\phi_{n+1}, \ldots, \phi_l$ may be used as a normal I/O state in the plaintext.

For the given relation, a setup function generates a CRS using the adopted zk-SNARK. Here, the CRS may be generated to include $G^{-\gamma}$.

A KeyGen function generates a private key, a public key, and a verification key, respectively.

An Enc function encrypts n message blocks and generates a zero-knowledge proof key $\pi$ for the n message blocks. At this time, the zero-knowledge proof key $\pi$ may be the proof of $\Phi=(m_1, \ldots, m_n, \phi_{n+1}, \ldots, \phi_l)$.

Verify_Enc may take the ciphertext CT and the zero-knowledge proof key $\pi$ as inputs for verification in order to check the zero-knowledge proof key $\pi$.

A Rerandomize function rerandomizes the given ciphertext and proof.

Dec may decrypt a ciphertext. In other words, Dec may decrypt each decrypted block $c_1, \ldots, c_n$ and output $m_1, \ldots, m_n$ and a decryption proof v:

An original message M may be restored like $M=(m_1 \| \ldots \| m_n)$.

A Verify_Dec function verifies whether the ciphertext CT is properly decrypted. Verify_Dec may verify whether the ciphertext CT is legitimately decrypted using the message M and the decryption proof v.

In SAVER, the ciphertext CT satisfies an additively homomorphic encryption attribute. For example, it is assumed that $CT = (X_0^r, \{X_i^r G_i^{m_i}\}_{i=1}^n, P_1^r \Pi_{j=1}^n Y_j^{m_j})$ and $CT^l = (X_0^{r'}, \{X_i^{r'} G_i^{m'_i}\}_{i=1}^n, P_1^{r'} \Pi_{j=1}^n Y_j^{m'_j})$ have been given.

Since $CT \cdot CT^l = (X_0^{r+r'}, \{X_i^{r+r'} G_i^{m_i+m'_i}\}_{i=1}^n, P_1^{r+r'} \Pi_{j=1}^n Y_j^{m_j+m'_j})$, it can be seen that the additively homomorphic encryption attribute is satisfied.

In step 120, the computing device 100 generates a zero-knowledge proof key $\pi$ by applying n message blocks to a preset zero-knowledge proof algorithm as inputs.

In step 125, the computing device 100 rerandomizes the ciphertext CT and the zero-knowledge proof key $\pi$ using a public key PK.

Thereafter, in step 130, the computing device 100 verifies the zero-knowledge proof key by using the CRS, the ciphertext CT, the zero-knowledge proof key $\pi$, and $\phi_{n+1}, \ldots, \phi_l$.

In step 135, the computing device 100 decrypts the ciphertext CT using the CRS, a secret key, and a verification key to acquire a plurality of message blocks, and restores the message M by combining the message blocks. Step 135 may also be performed on another computing device.

Thereafter, the computing device 100 verifies whether the ciphertext CT has been legitimately decrypted. For example, the computing device 100 may verify whether the ciphertext CT is legitimately decrypted using the message M and the decryption proof v.

Figure 4:
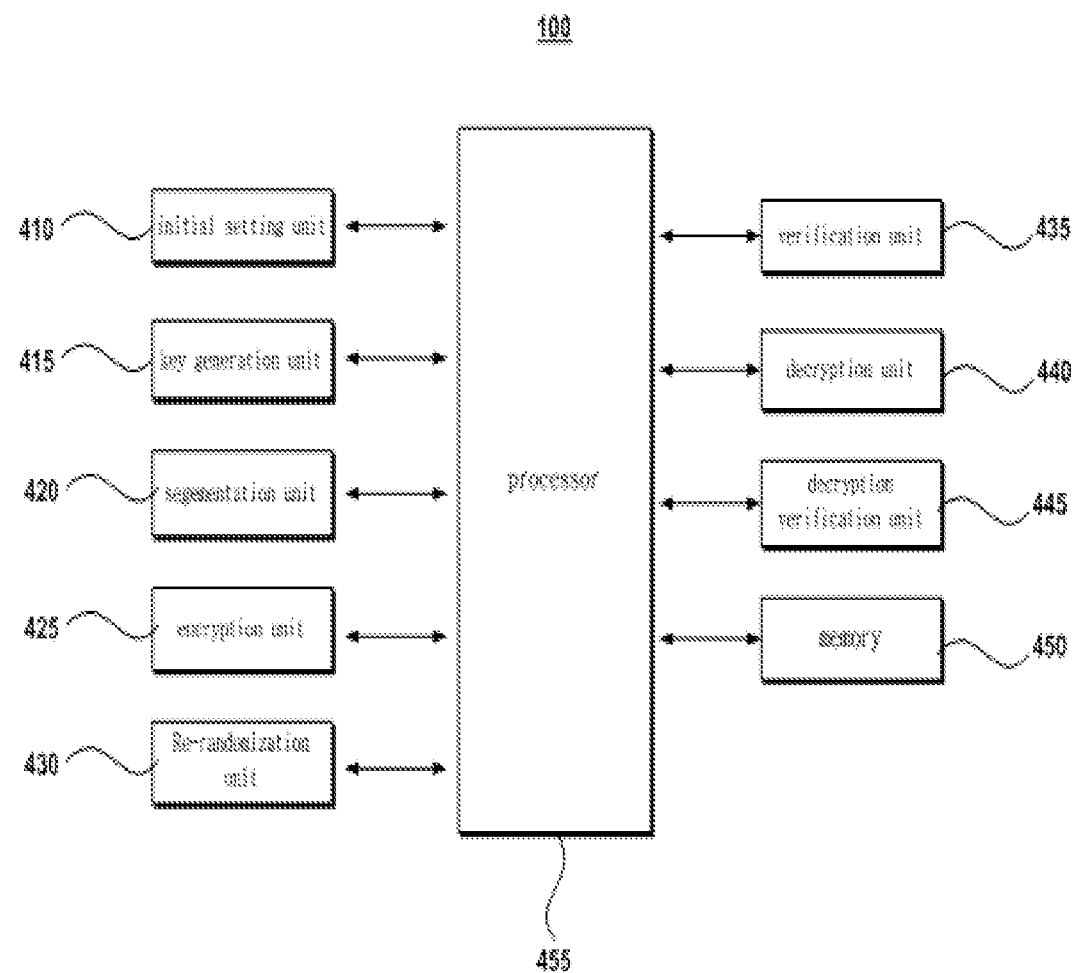
FIG. 4 is a block diagram schematically illustrating an internal configuration of a computing device according to an embodiment of the present invention.

FIG. 4 is a block diagram schematically illustrating an internal configuration of a computing device according to an embodiment of the present invention.

Referring to FIG. 4, the computing device 100 according to an embodiment of the present invention is configured to include an initial setting unit 410, a key generation unit 415, a division unit 420, an encryption unit 425, a rerandomization unit 430, a verification unit 435, a decryption unit 440, a decryption verification unit 445, a memory 450, and a processor 455.

The initial setting unit 410 is a means for generating a common reference string (CRS) using a relation R. As already described above, the CRS may include a random value as an exponentiation of a generator G for zero-knowledge proof verification for a ciphertext CT.

The key generation unit 415 is a means for generating a secret key, a public key, and a verification key by using the CRS generated by the initial setting unit 410.

The division unit 420 is a means for dividing the message M into n message blocks.

The encryption unit 425 is a means that encrypts the n message blocks to generate a ciphertext CT, and applies the n message blocks as an input to a preset zero-knowledge proof algorithm to generate a zero-knowledge proof key $\pi$ for the n message blocks.

The pseudo codes for this are as illustrated in FIG. 3.

The rerandomization unit 430 is a means for rerandomizing the ciphertext CT and the zero-knowledge proof $\pi$ key using a public key.

The verification unit 435 is a means for verifying the zero-knowledge proof key $\pi$ by using the CRS, the ciphertext CT, the zero-knowledge proof key $\pi$, and a part of the relation R.

The decryption unit 440 is a means for decrypting the ciphertext CT using the CRS, a secret key, and a verification key to acquire a plurality of message blocks, and restoring the message M by combining the message blocks.

The decryption verification unit 445 is a means for verifying whether the ciphertext CT is legitimately decrypted using the message M and the decryption verification key.

The memory 450 is a means for storing instructions (program codes) required for performing the homomorphic encryption method specialized for zero-knowledge proof according to an embodiment of the present invention.

The processor 455 is a means for controlling internal components of the computing device 100 according to an embodiment of the present invention (e.g., the initial setting unit 410, the key generation unit 415, the division unit 420, the encryption unit 425, the rerandomization unit 430, the verification unit 435, the decryption unit 440, the decryption verification unit 445, the memory 450, and the like).

Besides, it is natural that the computing device according to an embodiment of the present invention may further include a communication unit. That is, the computing device may receive information on the relation R from the outside through the communication unit.

Hereinabove, the present invention has been described with reference to the embodiments thereof. It is understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is defined by the appended claims rather than by the foregoing description, and all differences within the scope of equivalents thereof should be construed as being included in the present invention.

What is claimed is:

1. A homomorphic encryption method specialized for zero-knowledge proof, comprising:
   (a) dividing a message M into n message blocks;
   (b) generating a ciphertext CT by encrypting the n message blocks, wherein the ciphertext CT includes each encryption block for each of the n message blocks, and the each encryption block includes the each message block in the form $G_i^{m_i}$ of an exponentiation of a generator G;
   (c) generating a common reference string (CRS) using a relation R;

(d) generating a zero-knowledge proof key π for the n message blocks by applying the n message blocks as inputs to a preset zero-knowledge proof algorithm;

(e) acquiring the n message blocks by decrypting the ciphertext CT using the CRS, a secret key, and a verification key; and (f) restoring the message M by combining the n message blocks, wherein i represents an index of the each message block.

2. The homomorphic encryption method specialized for zero-knowledge proof of claim 1, further comprising:
wherein the relation R includes the n message blocks as input/output statements, and the CRS includes , wherein $G^{-\gamma}$, represents the generator and r represents a random value.

3. The homomorphic encryption method specialized for zero-knowledge proof of claim 1, wherein each of the encryption blocks further includes a blind factor $X^r$.

4. The homomorphic encryption method specialized for zero-knowledge proof of claim 1, further comprising:
verifying the zero-knowledge proof key π by using the CRS, the ciphertext CT, and a part of the relation R.

5. The homomorphic encryption method specialized for zero-knowledge proof of claim 1, further comprising:
before step (c),
rerandomizing the ciphertext CT and the zero-knowledge proof key π using a public key.

6. A recording media product as a non-transitory computer-readable recording medium product for recording program codes for performing a homomorphic encryption method specialized for zero-knowledge proof, comprising:

(a) dividing a message M into n message blocks;

(b) generating a ciphertext CT by encrypting the n message blocks, wherein the ciphertext CT includes each encryption block for each of the n message blocks, and the each encryption block includes the each message block in the form $G_i^{m_i}$ of an exponentiation of a generator G;

(c) generating a common reference string (CRS) using a relation R;

(e) generating a zero-knowledge proof key π for the n message blocks by applying the n message blocks as inputs to a preset zero-knowledge proof algorithm;

(e) acquiring the n message blocks by decrypting the ciphertext CT using the CRS, a secret key, and a verification key; and (f) restoring the message M by combining the n message blocks, wherein i represents an index of the each message block.

7. A computing device comprising:
a division processor configured to divide a message M into n message blocks;

an encryption processor configured to generate a ciphertext CT by encrypting the n message blocks and generate a zero-knowledge proof key π for the n message blocks by applying the n message blocks as inputs to a preset zero-knowledge proof algorithm, wherein the ciphertext CT includes each encryption block for each of the n message blocks, and the each encryption block includes the each message block in the form $G_i^{m_i}$ of an exponentiation of a generator G;

an initial setting processor configured to generate a common reference string (CRS) using a relation R;

a decryption processor configured to acquire the n message blocks by decrypting the ciphertext CT using the CRS, a secret key, and a verification key and restore the message M by combining the n message blocks, wherein i represents an index of the each message block.

8. The computing device of claim 7, further comprising:
wherein the relation R includes the n message blocks as input/output statements, and the CRS includes $G^{-\gamma}$, wherein G represents thea generator and r represents a random value.

9. The computing device of claim 7, wherein each of the encryption blocks furtheer includes a blind factor $X^r$.

10. The computing device of claim 7, further comprising:
a verification unit configured to verify the zero-knowledge proof key π by using the CRS, the ciphertext CT, and a part of the relation R.

11. The computing device of claim 7, further comprising:
a rerandomization unit configured to rerandomize the ciphertext CT and the zero-knowledge proof π using a public key.

* * * * *